United States Patent
Moon et al.

(10) Patent No.: US 8,516,522 B2
(45) Date of Patent: Aug. 20, 2013

(54) APPARATUS AND METHOD OF CONTROLLING BROADCAST SERVICES

(75) Inventors: Jung Mo Moon, Daejeon (KR); Mi Young Yun, Daejeon (KR); Sang Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 266 days.

(21) Appl. No.: 12/970,256

(22) Filed: Dec. 16, 2010

(65) Prior Publication Data

US 2011/0145861 A1    Jun. 16, 2011

(30) Foreign Application Priority Data

Dec. 16, 2009   (KR) .................. 10-2009-0125328
Mar. 17, 2010   (KR) .................. 10-2010-0023876

(51) Int. Cl.

| H04N 7/16 | (2011.01) |
|---|---|
| H04N 7/20 | (2006.01) |
| H04N 5/45 | (2011.01) |
| G06F 3/00 | (2006.01) |
| G06F 13/00 | (2006.01) |
| H04W 4/00 | (2009.01) |

(52) U.S. Cl.
USPC ................. 725/39; 725/62; 725/73; 370/329; 370/341

(58) Field of Classification Search
USPC ............... 725/39, 62, 73, 105, 143; 370/312, 370/329, 341, 390; 455/446
See application file for complete search history.

(56) References Cited

U.S. PATENT DOCUMENTS

| 2007/0275742 A1 | 11/2007 | Zhang |
| 2010/0080161 A1* | 4/2010 | Hayashi ..................... 370/312 |
| 2010/0195558 A1* | 8/2010 | Koskinen ................... 370/312 |

FOREIGN PATENT DOCUMENTS

| JP | 2009-153222 | 7/2009 |
| KR | 1020080013244 | 2/2008 |

* cited by examiner

*Primary Examiner* — Hai V Tran
(74) *Attorney, Agent, or Firm* — Nelson Mullins Riley & Scarborough LLP

(57) ABSTRACT

Provided is the broadcast service controlling apparatus and method. The broadcast service controlling method may perform grouping, into a broadcast group, broadcast services having the same transmission feature, may control scheduling information associated with the broadcast services included in the broadcast group and thus, may dynamically perform scheduling with respect to broadcast services.

16 Claims, 4 Drawing Sheets

APPARATUS AND METHOD OF CONTROLLING BROADCAST SERVICES

CROSS-REFERENCE TO RELATED APPLICATION(S)

This application claims the benefit of Korean Patent Application Nos. 10-2009-0125328 and 10-2010-0023876, respectively filed on Dec. 16, 2009 and Mar. 17, 2010, in the Korean Intellectual Property Office, the disclosures of which are incorporated herein by references.

BACKGROUND

1. Field of the Invention

The present invention relates to a broadcast service controlling apparatus and method, and more particularly, to a broadcast service controlling apparatus and method in a single frequency network.

2. Description of the Related Art

To provide a broadcast service using a single frequency network transmission in a mobile communication system, all base stations included in the corresponding service area transmit the same data at the same time over a radio section. Accordingly, each of the base stations may use the same scheduling algorithm to perform synchronous transmission.

A conventional broadcast service controlling apparatus may change priorities of broadcast services or a scheduling period through a multi-cell/multicast coordinate entity (MCE) to change a sequence of scheduling with respect to the broad services or to change a scheduling period with respect to the broadcast services.

Therefore, the conventional broadcast service controlling apparatus may ignore dynamic changes in the scheduling priorities or a temporal change in broadcast traffic. When a Multimedia Broadcast and Multicast Services service allocation pattern (MSAP) period is lengthen to increase a service multiplexing effect, a time expended for channel zapping during channel switching between broadcast services may increase.

Accordingly, a method of dynamically controlling scheduling information of a broadcast service is desired.

SUMMARY

An aspect of the present invention provides a method that may perform grouping, into a broadcast group, broadcast services having the same transmission feature, and may control scheduling information associated with the broadcast services included in the broadcast group and thus, may dynamically perform scheduling with respect to broadcast services.

According to an aspect of the present invention, there is provided a broadcast service controlling apparatus, the apparatus including a broadcast group generating unit to perform grouping, into at least one broadcast group, with respect to broadcast services having the same transmission feature from among multiple broadcast services, and an identification (ID) allocating unit to allocate a tunnel endpoint identifier (TEID) to a broadcast group.

According to an aspect of the present invention, there is provided a broadcast service controlling method, the method including grouping, into at least one broadcast group, broadcast services having the same transmission feature from among multiple broadcast services, and allocating a TEID to a broadcast group.

Additional aspects, features, and/or advantages of the invention will be set forth in part in the description which follows and, in part, will be apparent from the description, or may be learned by practice of the invention.

EFFECT

According to example embodiments, there may be provided a method that may perform grouping, into a broadcast group, broadcast services having the same transmission feature, may control scheduling information associated with the broadcast services included in the broadcast group and thus, may dynamically perform scheduling with respect to broadcast services.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
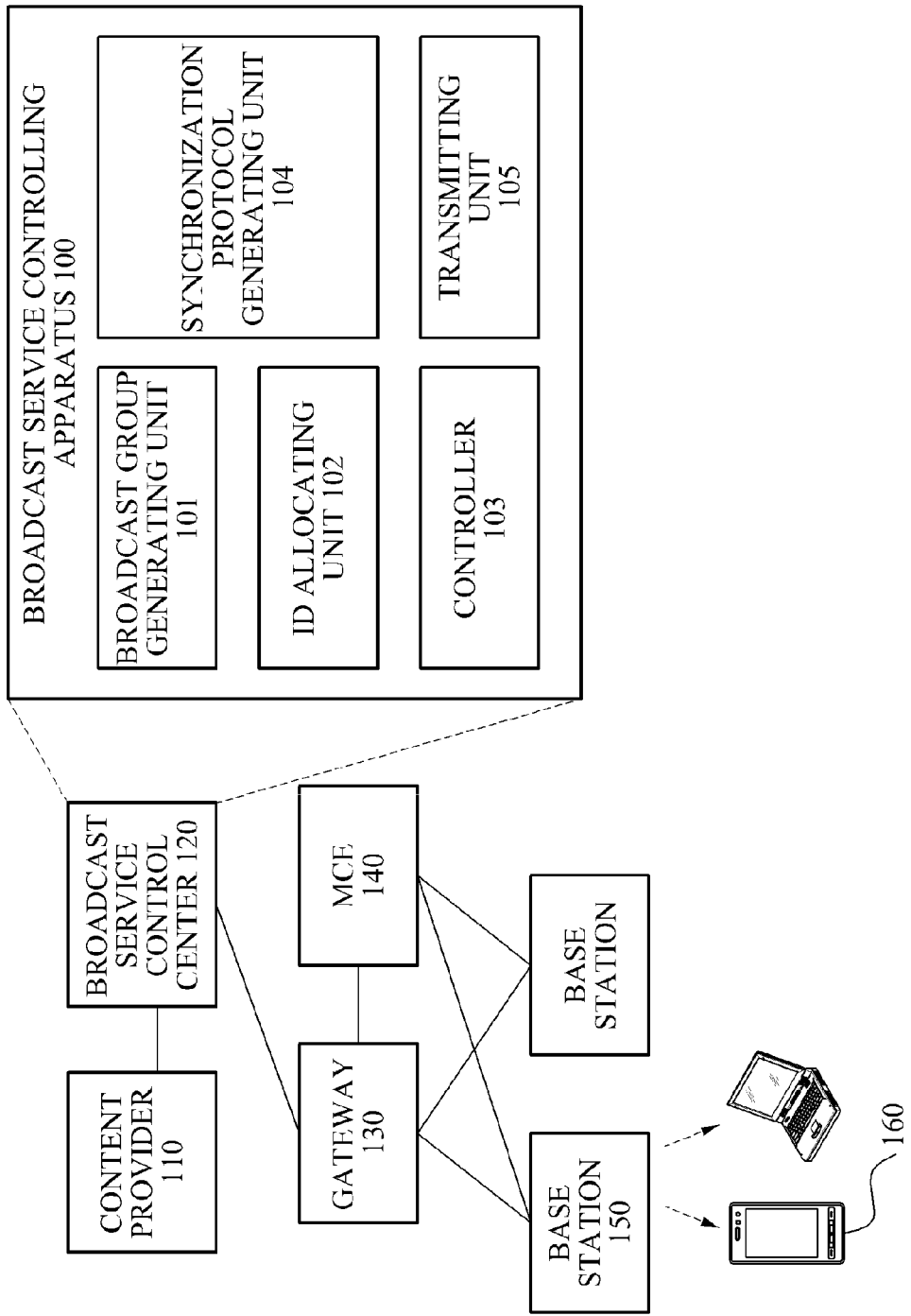
FIG. 1 is a diagram illustrating a configuration of a broadcast service network and a broadcast service controlling apparatus according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a configuration of a broadcast service network and a broadcast service controlling apparatus 100 according to an embodiment of the present invention.

Referring to FIG. 1, the broadcast service network may include a content provider 110, a broadcast service control center 120, a gateway 130, a multi-cell/multicast coordinate entity (MCE) 140, a base station 150, and a terminal 160.

The broadcast service network may be a multimedia broadcast multicast single frequency network (MBSFN).

The content provider 110 may provide a content associated with a broadcast service.

The broadcast service control center 120 may control the broadcast service. The broadcast service control center 120 may control the broadcast service through the broadcast service controlling apparatus 100.

The broadcast service controlling apparatus 100 may include a broadcast group generating unit 101 and an ID allocating unit 102.

The broadcast group generating unit 101 may perform grouping, into at least one broadcast group, with respect to broadcast services having the same transmission feature from among multiple broadcast services provided by the content provider 110. For example, the broadcast group generating unit 101 may perform grouping, into a single broadcast group, with respect to broadcast services in a video format, and may perform grouping, into another single group, with respect to broadcast services in an audio format.

Depending on embodiments, the broadcast group generating unit 101 may perform grouping, into a single broadcast group, with respect to broadcast services having the same modulation and coding scheme (MCS) from among the multiple broadcast services. The broadcast group generating unit 101 may selectively perform grouping, into a broadcast group, with respect to broadcast services having either the same modulation scheme or the same coding scheme.

The ID allocating unit 102 may allocate a tunnel endpoint identifier (TEID) to the broadcast group generated by the broadcast group generating unit 101. Depending on embodiments, the ID allocating unit 102 may allocate a sub tunnel endpoint (sub-TEID) to each of broadcast services included in the broadcast group.

According to an aspect of the present invention, the broadcast service controlling apparatus 100 may further include a controller 103.

The controller 103 may control scheduling information with respect to the broadcast services included in the broadcast group.

The scheduling information may include a service period and a service sequence of the broadcast services included in the broadcast group.

The broadcast service control center 120 may measure a change in broadcast traffic. When a burst of the broadcast traffic occurs, the controller 103 may control scheduling information with respect to the broadcast services included in the single broadcast group. For example, the controller 103 may change at least one of the service period and the service sequence of the broadcast services.

According to an aspect of the present invention, broadcast service controlling apparatus 100 may further include a synchronization protocol generating unit 104.

The synchronization protocol generating unit 104 may generate a synchronization protocol (SYCN protocol) associated with synchronization of the broadcast services included in the broadcast group.

Multiple base stations in an area of the broadcast service network may perform synchronization to transmit, to multiple terminals, packets associated with the same broadcast service at the same time, and the synchronization protocol generating unit 104 may generate a synchronization protocol including information associated with the synchronization.

The synchronization protocol may include at least one of a timestamp with respect to a transmission time of each of packets corresponding to the broadcast services included in the broadcast group, a packet number of each packet, a number of octets included in each packet, and a TEID. The synchronization protocol may further include a sub-TEID.

According to an aspect to the present invention, the broadcast service controlling apparatus 100 may further include the transmitting unit 105.

The transmitting unit 105 may transmit, to the gateway 130, the synchronization protocol generated by the synchronization protocol generating unit 104 and the broadcast group generated by the broadcast group generating unit 101.

Depending on embodiments, the broadcast group generating unit 101 and the synchronization protocol generating unit 104 may be a single generating module. Therefore, the single generating module may generate a broadcast group and may generate a synchronization protocol.

The transmitting unit 105 may transmit, to the gateway 130, a Multimedia Broadcast and Multicast Services (MBMS) session start request message, and may transmit, to the gateway 130, the synchronization protocol and the packets corresponding to the broadcast services included in the broadcast group.

Depending on embodiments, the MBMS session start request message may include at least one of the TEID allocated to the broadcast group and the sub TEIDs allocated to the broadcast services included in the broadcast group. The sub TEID will be described with reference to FIG. 2.

The gateway 130 may receive the MBMS session start request message from the broadcast service controlling apparatus 100. The gateway 130 may receive the packets corresponding to the broadcast services included in the broadcast group from the broadcast service controlling apparatus 100 included in the broadcast service control center 120. The gateway 130 may transmit, to the MCE 140 and the multiple base stations, the MBMS session start request message and the received packets, respectively.

The MCE 140 may allocate the same scheduling information to the multiple base stations.

The base station 150 may receive the packets corresponding to the broadcast services from the gateway 130, and may provide the broadcast services to the multiple terminals.

Figure 2:
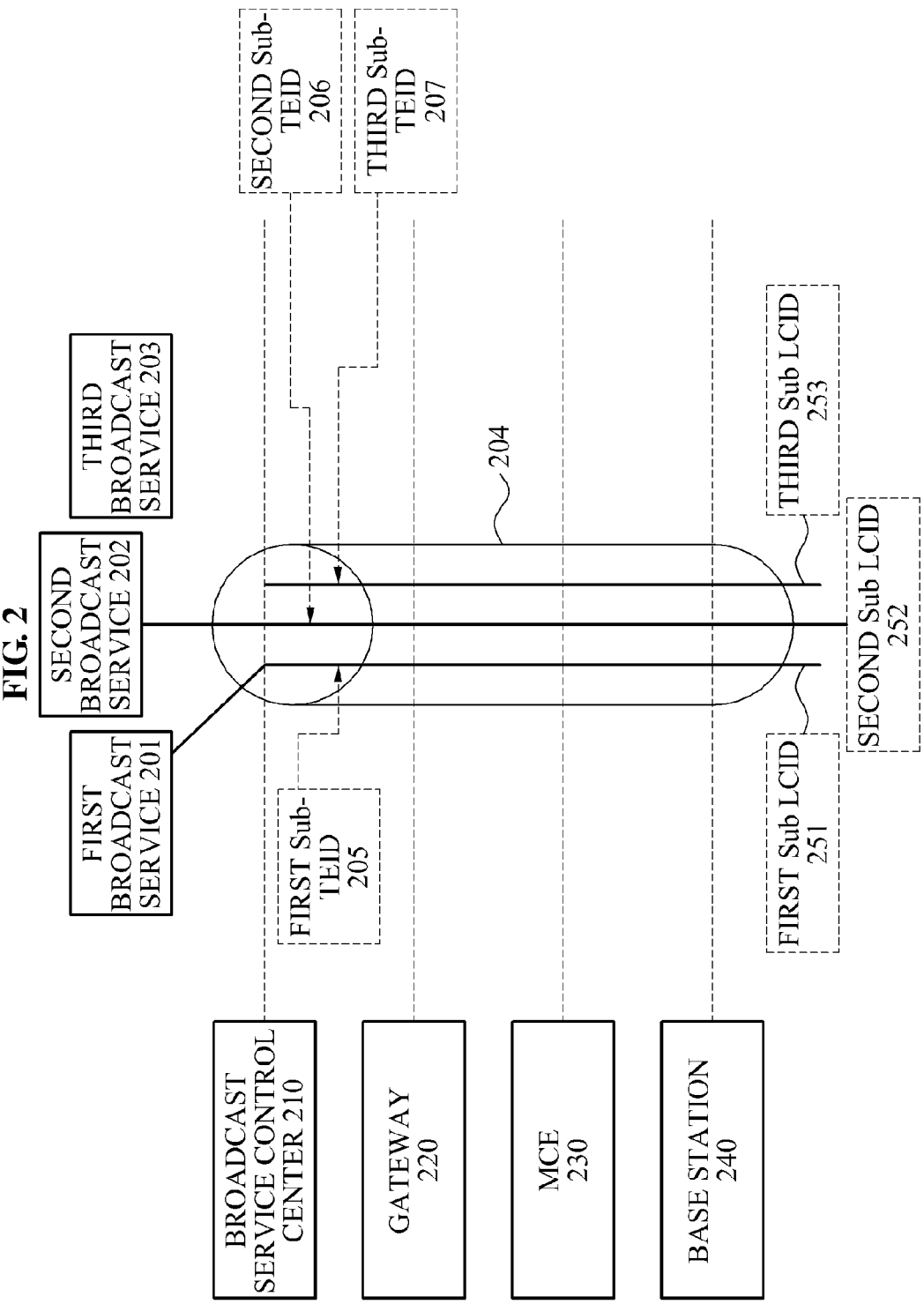
FIG. 2 is a diagram illustrating a broadcast group according to an embodiment of the present invention.

FIG. 2 illustrates a broadcast group according to an embodiment of the present invention.

Referring to FIG. 2, the broadcast service control center 210 may receive, from a content provider, a first broadcast service 201, a second broadcast service 202, and a third broadcast service 203, which have the same transmission feature.

The broadcast service control center 210 may perform grouping, into a single broadcast group 204, with respect to the first broadcast service 201, the second broadcast service 202, and the third broadcast service 203.

The broadcast service control center 210 may allocate a sub-TEID to each of the first broadcast service 201, the second broadcast service 202, and the third broadcast service 203 included in the broadcast group 204. The broadcast service control center 210 may allocate a first sub-TEID 205 to the first broadcast service 201 included in the broadcast group 204. The broadcast service control center 210 may allocate a second sub-TEID 206 to the second broadcast service 202 included in the broadcast group 204. The broadcast service control center 210 may allocate a third sub-TEID 207 to the third broadcast service 203 included in the broadcast service 204.

The broadcast service control center 210 may transmit, to the gateway 220, packets associated with the first broadcast service 201, the second broadcast service 202, and the third broadcast service 203.

The gateway 220 may transmit the received packets to the base station 240.

The base station 240 may identify the broadcast services included in the broadcast group 204 based on the sub TEIDs.

The sub-TEIDs may correspond one-to-one with sub logical channel IDs (sub-LCIDs). Depending on example embodiments, the first sub TEID 205 may correspond to a first sub-LCID 252. The second sub TEID 206 may correspond to a second sub-LCID 252. The third sub TEID 207 may correspond to a third sub-LCID 253.

Figure 3:
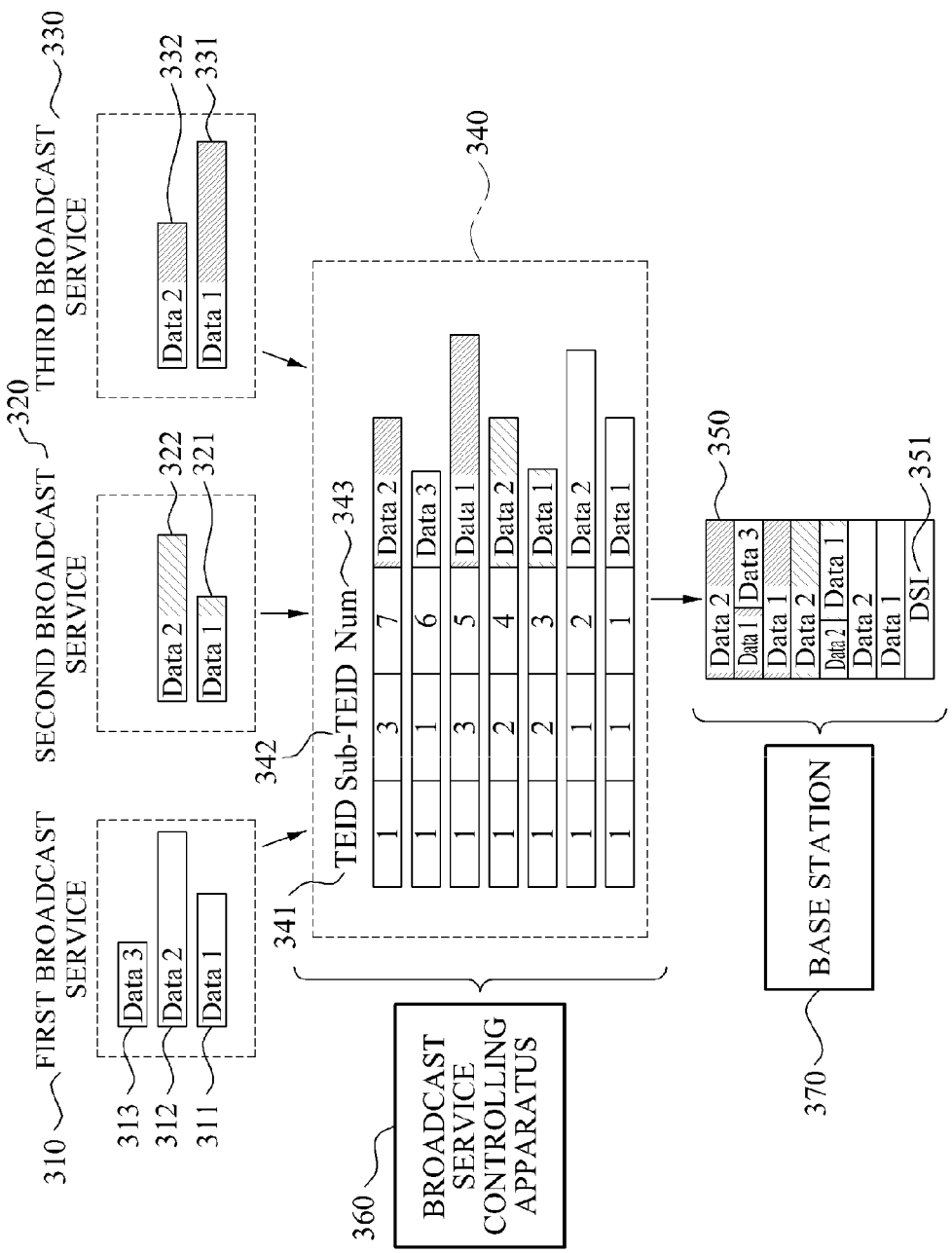
FIG. 3 is a diagram illustrating that a broadcast service controlling apparatus performs grouping of broadcast services according to an example embodiment of the present invention.

FIG. 3 illustrates that a broadcast service controlling apparatus 360 performs grouping of broadcast services according to an example embodiment of the present invention.

Referring to FIG. 3, the broadcast service controlling apparatus 360 may perform grouping, into a broadcast group 340, with respect to a first broadcast service 310, a second broadcast service 320, and a third broadcast service 330, which have the same transmission feature.

The first broadcast service 310 may include data (1) 311, second data (2) 311, and third data (3) 313. The second broadcast service 320 may include data (1) 321 and data (2) 322. The third broadcast service 330 may include data (1) 331 and data (2) 332.

The broadcast service controlling apparatus 360 may allocate, to the broadcast group 340, a TEID 341 of 1.

The broadcast service controlling apparatus 360 may allocate a sub-TEID 342 of '1' to the first broadcast service 310 included in the broadcast group 340. The broadcast service controlling apparatus 360 may allocate the sub TEID 342 of '2' to the second broadcast service 320 included in the broadcast group 340. The broadcast service controlling apparatus 360 may allocate the sub-TEID 342 of '3' to the third broadcast service 330 included in the broadcast group 340.

The broadcast service controlling apparatus 360 may control scheduling information associated with the first broadcast service 201, the second broadcast service 202, and the third broadcast service 230. Depending on embodiments, the broadcast service controlling apparatus 360 may change a service sequence of the first broadcast service 201, the second broadcast service 202, and the third broadcast service 230.

The broadcast service controlling apparatus 360 may control the scheduling information to enable a content corresponding to the data (1) 311 of the first broadcast service 310 to be first broadcasted. In this example, a packet number 343 of '1' may be allocated to the data (1) 311 of the first broadcast service 310.

The broadcast service controlling apparatus 360 may transmit, to the base station 370, packets corresponding to the broadcast group 340. Depending on embodiments, the broadcast service controlling apparatus 360 may transmit a synchronization protocol to the base station 370. The synchronization protocol may include at least one of information associated with the TEID 341, a timestamp to be scheduled in a radio section, information associated with the sub-TEIDs, the packet number 343 of each packet, and information associated with a total number of octets.

The base station 370 may identify an MBMS service allocation pattern (MSAP) based on a logical channel ID corresponding to the TEID 341. The base station 370 may perform scheduling of broadcast services based on a packet of a subframe 350 corresponding to the identified MSAP. In this example, a scheduler of the base station 370 may allocate radio resources for each subframe based on the packet number 343 associated with sequence information associated with packets included in the synchronization protocol. The base station 370 may generate dynamic scheduling information (DSI) 351 associated with information associated with allocated radio resources. The base station 370 may transmit the generated DSI 351 to a physical layer.

Figure 4:
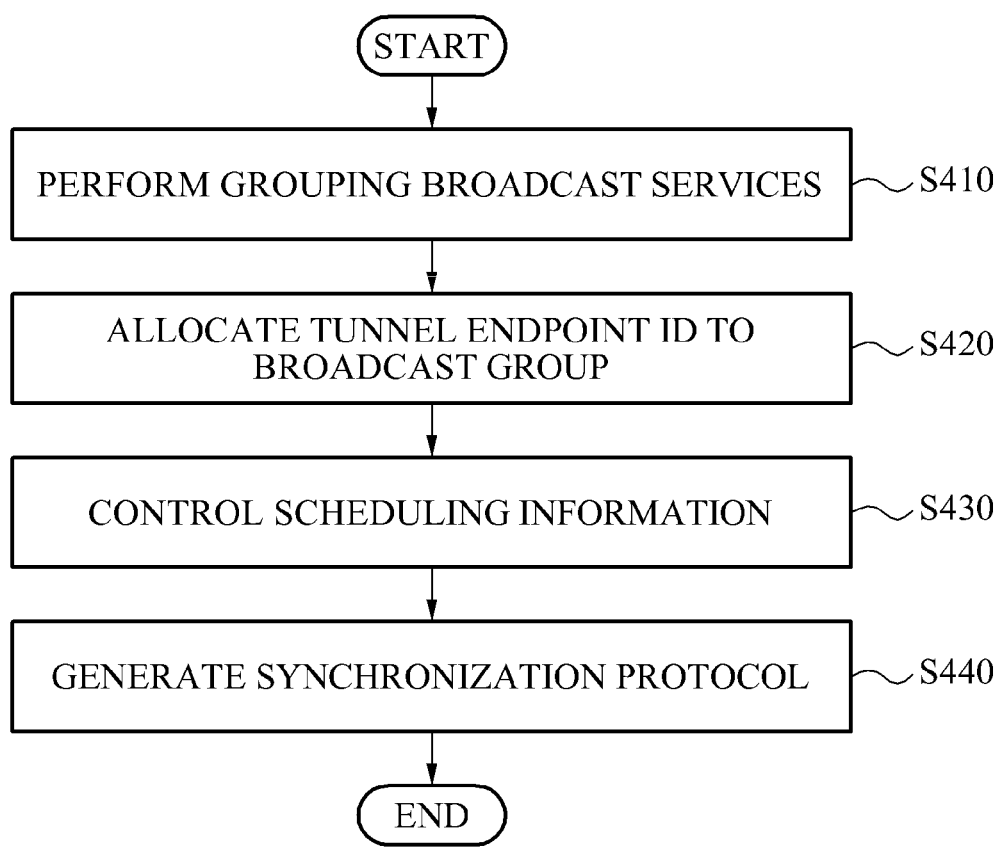
FIG. 4 is a flowchart illustrating a broadcast service controlling method according to an embodiment of the present invention.

FIG. 4 illustrates a flowchart service controlling method according to an embodiment of the present invention.

Referring to FIG. 4, the broadcast service controlling method may perform grouping, into at least one broadcast group, with respect to broadcast services having the same transmission feature from among multiple broadcast services in operation 410.

Depending of embodiments, the broadcast service controlling method may perform grouping, into a single broadcast group, broadcast services having the same modulation and coding scheme (MSC) from among the multiple broadcast services. Also, the broadcast service controlling method may perform grouping, into a broadcast group, with respect to broadcast service having either the same modulation scheme or the same coding scheme.

The broadcast service controlling method allocates a TEID to a broadcast group in operation 420. Depending on embodiments, the broadcast service controlling method may allocate a sub-TEID to each of broadcast services included in the broadcast group.

In an aspect of the present invention, the broadcast service controlling method controls scheduling information with respect to the broadcast services included in the broadcast group in operation 430.

The scheduling information may include information associated with a service period and a service sequence of the broadcast services included in the at least one broadcast group.

Depending on embodiments, the broadcast service controlling method may change at least one of the service period and the service sequence of the broadcast services.

According to an aspect to the present invention, the broadcast service controlling method generates a synchronization protocol associated with synchronization of the broadcast services included in the broadcast group in operation 440.

The synchronization protocol may include at least one of a timestamp associated with a transmission time of each of packets corresponding to the broadcast services included in the broadcast group, a packet number of each packet, a number of octets included in each packet, and a TEID. The synchronization protocol may further include a sub-TEID.

According to an aspect of the present invention, the broadcast service controlling method may transmit information associated with the synchronization protocol to the gateway. Also, the broadcast service controlling method may transmit, to the gateway, packets corresponding to the broadcast services included in the broadcast group.

The broadcast service controlling method may transmit, to the gateway, the packets corresponding to the broadcast services included in the broadcast group, and may transmit, to the gateway, an MBMS session start request message.

Depending on embodiments, the MBMS session start request message may include at least one of the TEID allocated to the broadcast group and the sub-TEIDs allocated to the broadcast services included in the broadcast group.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus of controlling broadcast services, the apparatus comprising:
a broadcast group generating unit configured to execute instructions stored in a non-transitory computer readable medium to perform grouping, into at least one broadcast group, with respect to broadcast services having the same transmission feature from among multiple broadcast services; and
an identification (ID) allocating unit configured to execute instructions stored in a non-transitory computer readable medium to allocate a tunnel endpoint identifier (TEID) to a broadcast group,
wherein the ID allocating unit allocates a sub-tunnel endpoint identifier (sub-TEID) to each of broadcast services included in the broadcast group.

2. The apparatus of claim 1, wherein the broadcast group generating unit performs grouping with respect to the broadcast services having the same modulation scheme or the same coding scheme, from among the multiple broadcast services.

3. The apparatus of claim 1, further comprising: a controller to control scheduling information with respect to broadcast services included in the broadcast group.

4. The apparatus of claim 3, wherein: the scheduling information includes a service period and a service sequence of the broadcast services; and the controller changes at least one of the service sequence and the service period.

5. The apparatus of claim 1, further comprising: a synchronizing protocol generating unit configured to execute instructions stored in a non-transitory computer readable medium to generate a synchronization protocol associated with synchronization of broadcast services included in the broadcast group; and a transmitting unit to transmit, to a gateway, the generated synchronization protocol and packets corresponding to the broadcast services included in the broadcast group.

6. The apparatus of claim 5, wherein the synchronization protocol comprises at least one of a timestamp associated with a transmission time of each of the packets corresponding to the broadcast services, a packet number of each packet, a number of octets included in each packet, and the TEID.

7. The apparatus of claim 5, wherein the transmitter transmits, to the gateway, a multimedia broadcast and multicast service (MBMS) session start request message.

8. The apparatus of claim 7, wherein the MBMS session start request message comprises at least one of the TEID and sub-TEIDs allocated to the broadcast services included in the broadcast group.

9. A method of controlling broadcast services, the method comprising utilizing processing circuitry configured to execute instructions stored in a non-transitory computer readable medium to perform:
grouping, into at least one broadcast group, broadcast services having the same transmission feature from among multiple broadcast services;
allocating a tunnel endpoint identifier (TEID) to a broadcast group; and
allocating a sub-tunnel endpoint identifier (sub-TEID) to each of broadcast services included in the broadcast group.

10. The method of claim 9, wherein the grouping comprises grouping with respect to the broadcast services having the same modulation scheme or the same coding scheme, from among the multiple broadcast services.

11. The method of claim 9, further comprising: controlling scheduling information with respect to broadcast services included in the broadcast group.

12. The method of claim 11, wherein: the scheduling information includes a service period and a service sequence of the broadcast services; and the controlling comprises changing at least one of the service sequence and the service period.

13. The method of claim 9, further comprising: generating a synchronization protocol associated with synchronization of broadcast services included in the broadcast group; and transmitting, to a gateway, the generated synchronization protocol and packets corresponding to the broadcast services included in the broadcast group.

14. The method of claim 13, wherein the synchronization protocol comprises at least one of a timestamp associated with a transmission time of each of the packets corresponding to the broadcast services, a packet number of each packet, a number of octets included in each packet, and the TEID.

15. The method of claim 9, further comprising: transmitting, to the gateway, a multimedia broadcast and multicast service (MBMS) session start request message.

16. The method of claim 15, wherein the MBMS session start request message comprises at least one of the TEID, sub-TEIDs allocated to the broadcast services included in the broadcast group, and information associated with a mapping relationship between the sub-TEIDs and sub-logical channel IDs.

* * * * *